2 Sheets—Sheet 1.

T. A. WESTON.
Friction Brake and Clutch for Hoisting Drums, &c.

No. 212,338. Patented Feb. 18, 1879.

WITNESSES
Wm A Skinkle
Geo N Breck.

INVENTOR
Thomas A. Weston.
By his Attorneys
Baldwin, Hopkins, & Peyton

2 Sheets—Sheet 2.

T. A. WESTON.
Friction Brake and Clutch for Hoisting Drums, &c.

No. 212,338. Patented Feb. 18, 1879.

WITNESSES
Wm A Skinkle
Geo W Breck

INVENTOR
Thomas. A. Weston.
By his Attorneys
Baldwin, Hopkins, & Peyton.

N. PETERS, PHOTO-LITHOGRAPHER, WASHINGTON, D. C.

UNITED STATES PATENT OFFICE.

THOMAS A. WESTON, OF STAMFORD, CONNECTICUT, ASSIGNOR TO THE YALE LOCK MANUFACTURING COMPANY, OF SAME PLACE.

IMPROVEMENT IN FRICTION BRAKE AND CLUTCH FOR HOISTING-DRUMS, &c.

Specification forming part of Letters Patent No. 212,338, dated February 18, 1879; application filed August 26, 1878.

*To all whom it may concern:*

Be it known that I, THOMAS A. WESTON, of Stamford, in the county of Fairfield and State of Connecticut, have invented certain Improvements in Friction-Brake Clutches for Machinery, of which the following is a specification:

My invention is an improvement upon a similar one shown in Figs. 17 and 18 of my English Patent No. 960 of 1873; and it belongs to that class of frictional devices which are operative as driving-clutches, and also as brakes, to control and arrest rotatory motion in shafts or drums. An early illustration of a frictional driver, but inoperative for brake purposes, is found in Plate XI, Fig. 8, Nos. 1 and 2, of Robertson Buchanan's "Practical Essays on Mill-Work and other Machinery," published at London, England, A. D. 1841, by John Weale.

The said simple device consists of a common friction-band in one piece or in halves, the ends of which are pinched together by screw-bolts, so as to embrace the rim of a pulley, and furnish a yielding or frictional device through which to transmit power from any rotatory driver.

The object of my invention is to render the said device capable of being released, or of acting as an ordinary friction-brake when the direction of the driving motion is reversed.

I am aware that there are many other devices which are operative so as to produce the results of my invention, but by essentially different means—as, for example, the device described in my United States Patent dated December 14, 1869, No. 98,000, and that of the English Patent of Léandre Mégy, dated June 22, 1870, No. 1777.

Figure 1:
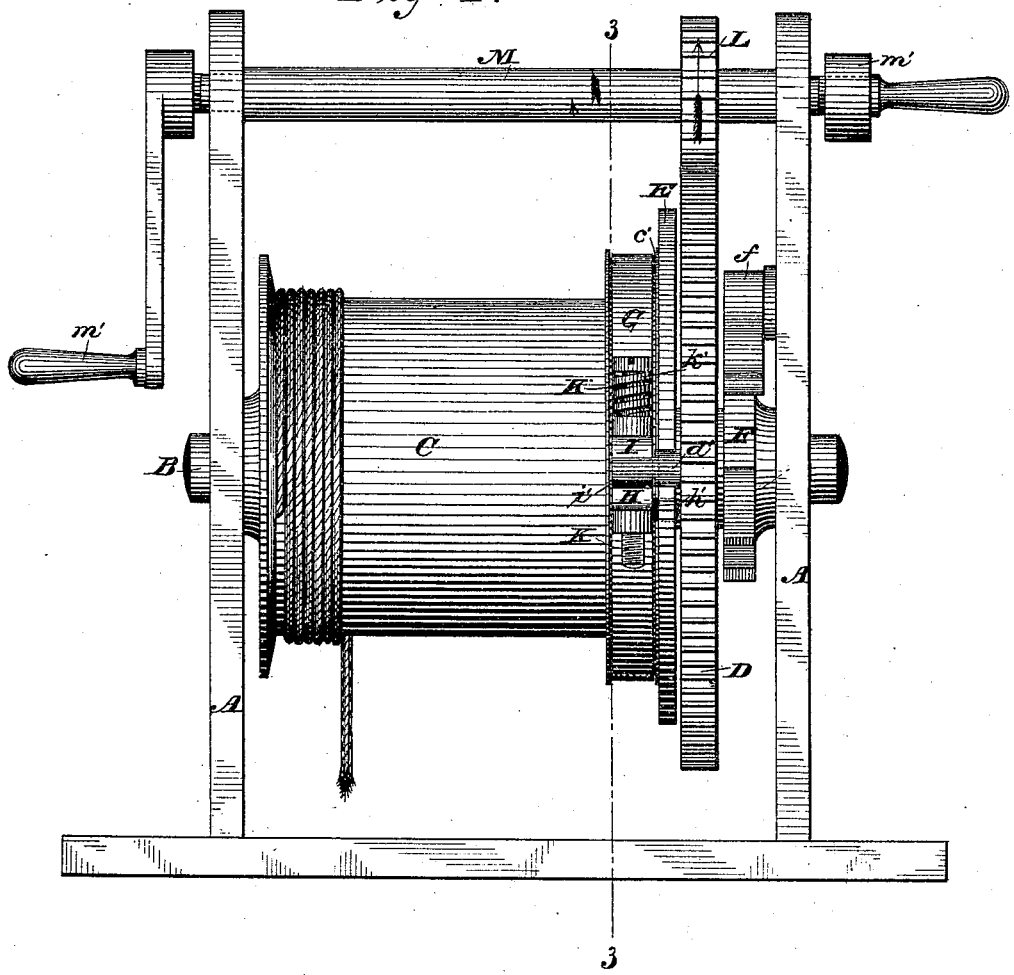
Figure 2:
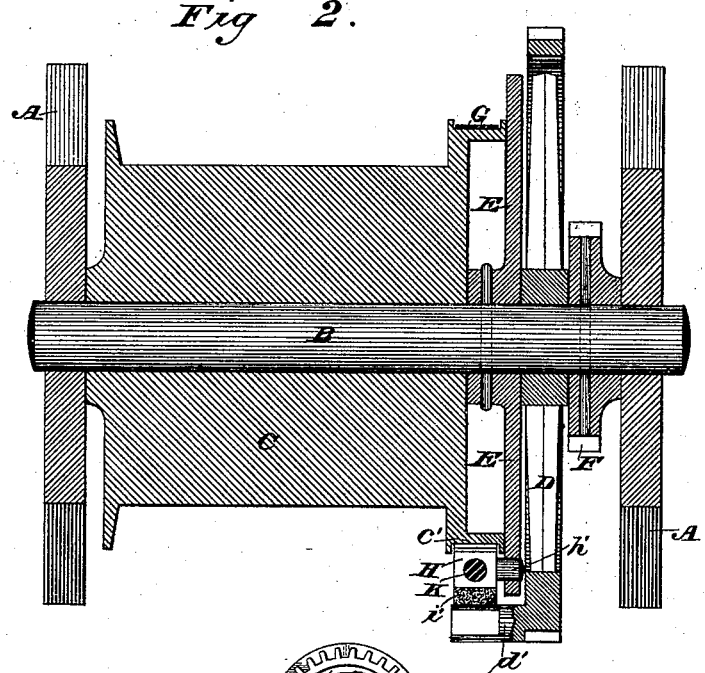
Figure 3:
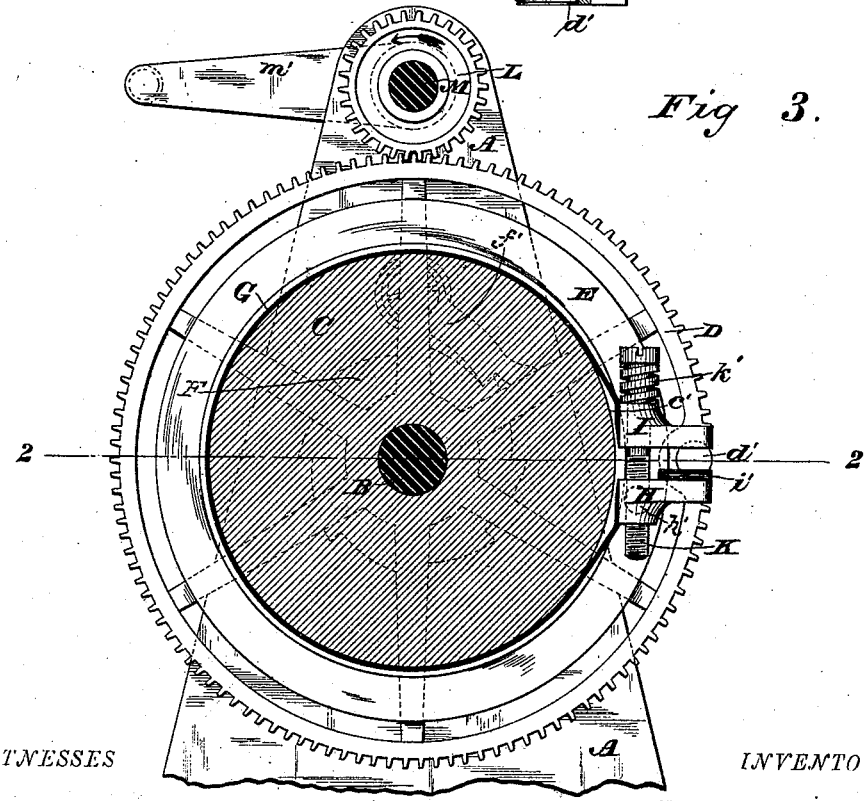

In the accompanying drawings, Figure 1 is a side elevation of a hoist embodying my invention. Fig. 2 is a transverse section in the line 2 2, Fig. 3. Fig. 3 is a vertical section in the line 3 3, Fig. 1.

A is the supporting-frame. B is the main shaft, carrying loosely thereon the drum C and main wheel D. The disk E and ratchet-wheel F are keyed to the shaft. *f* is a pawl hung to the frame A. G is a friction-band, fixed at one end to the lug H, which is itself secured to the disk E by the stud or boss *h'*.

In lieu of the disk E an arm or any rigid connection with the shaft will answer. The free end of the band G is fixed to the lug I. A screw-bolt, K, unites the lugs H and I, passing loosely through the lug I, and being screw-threaded into the lug H. Between the said lugs the stud *d'*, carried by the main wheel D, enters to act as a driver. Springs or elastic material of a suitable kind may be placed upon the inner faces of the lugs, as shown at *i'*, for the driving-stud *d'* to press upon, and thus render its driving action noiseless and without concussion. *k'* is a spiral spring between the head of the screw-bolt K and the lug I. L is a pinion, fixed to the shaft M, which carries the cranks *m'*.

The action is as follows: By means of the screw-bolt K, the band G is drawn around the friction-rim *c'* of the drum, so as to grasp it tightly enough to raise the maximum load which the drum has to sustain. Upon turning the pinion L in the direction of the arrow the stud *d'*, as a driver, will carry before it the lug H, which is fixed to the disk E and shaft, the ratchet F preventing backward motion. The band G being thus revolved will carry with it the drum C, by its frictional hold thereon, so long as the latter is superior to the resistance of the load. The overstraining of the machine is thus easily prevented by adjusting the frictional adhesion of the band G and the drum to their proper capacity and strength. Upon turning the wheel D very slightly in a contrary direction to the arrow by the cranks and pinion L, or by any convenient means, the stud *d'* will push the lug I backward, releasing the tension of the band G and compressing the spring against the head of the bolt K. Thus the drum may be entirely freed from the band G, if desired, so that its load may run down unchecked, or the drum be turned by hand to coil or uncoil slack rope; but at any moment at which the operator lets go the cranks the spring *k'* resumes its strain upon the band and restores the hold of the latter upon the drum. A graduated brake-action to secure any desired speed in a descending load may be obtained by the operator graduating the backward force of his hand upon the cranks, so as to furnish due resistance to the spring $k'$, and a proportionate diminution of friction betweeen the band G and drum. As the operator's hand feels constantly the resistance of the spring $k'$, he can instantly, by feeling, adapt his manipulation to the results. He can do this with his attention unembarrassed by any risk or danger arising from the machine itself, as it is self-arrested, the load staying at rest the moment he lets go the crank, whether he is hoisting by it or backing it for brake-action and lowering.

In old-style winches, one man is needed to hold onto the brake-lever and take the strain of the load, while another man slides the pinion and its shaft out of gear with the main wheel. When this is effected the man at the brake-lever can lower the load; but sometimes, by mistake, he lets go his force from the brake-lever a little too soon, before the other man has the gearing wholly free; broken bones and loss of life then frequently ensue. All such contingencies are precluded and a guarantee against an overload provided in my invention.

My invention is generally applicable as a driving and releasing clutch for shafts and machinery, preventing overstrain to the machine within any desired limit, and affording an automatic release when the driving is reversed, the last-named feature also affording protection to a machine from being driven in the wrong direction.

I claim as my invention—

1. In a friction-brake clutch, the combination of a driving-pulley having an external or convex friction-rim, a tensile friction-band, a yielding or elastic clamping device, whereby the ends of the friction-band are joined, disk or support E, driver $d'$, and engaging-lugs, substantially as described.

2. In a friction-brake clutch, the combination of an external annular friction-rim, an adjustable tensile friction-band, disk E, driving-stud $d'$, lugs H and I, bolt K, and spring $k'$, substantially as described.

3. In a friction-brake clutch, a driving-pulley having an external or convex friction-rim, a tensile friction-band, a yielding or elastic clamping device, whereby the ends of the friction-band are joined, disk or support E, driver $d'$, and engaging-lugs, in combination with a hoisting-drum, substantially as described.

4. In a friction-brake clutch, a driving-pulley having an external or convex friction-rim, a tensile friction-band, a yielding or elastic clamping device, whereby the ends of the friction-band are joined, disk or support E, driver $d'$, in combination with a ratchet-wheel, F, and pawl, substantially as described.

In testimony whereof I have hereunto subscribed my name.

THOS. A. WESTON.

Witnesses:
M. S. HOPKINS,
G. W. BRECK.